US011558444B1

(12) United States Patent
Kolowich et al.

(10) Patent No.: US 11,558,444 B1
(45) Date of Patent: Jan. 17, 2023

(54) AUTOMATIC DISCOVERY AND REPORTING OF STREAMING CONTENT OF INTEREST AND CONNECTION OF USER TO SAME

(71) Applicant: OpenExchange, Inc., Boston, MA (US)

(72) Inventors: Michael E. Kolowich, Quechee, VT (US); Alexander J. Kieft, Arlington, MA (US)

(73) Assignee: OpenExchange, Inc., Boston, MA (US)

( * ) Notice: Subject to any disclaimer, the term of this patent is extended or adjusted under 35 U.S.C. 154(b) by 0 days.

(21) Appl. No.: 17/452,708

(22) Filed: Oct. 28, 2021

(51) Int. Cl.
*H04L 29/06* (2006.01)
*H04L 12/28* (2006.01)
*H04L 65/70* (2022.01)
*H04L 65/75* (2022.01)
*H04N 21/24* (2011.01)

(52) U.S. Cl.
CPC .............. *H04L 65/70* (2022.05); *H04L 65/75* (2022.05)

(58) Field of Classification Search
USPC ......................................................... 709/231
See application file for complete search history.

(56) References Cited

U.S. PATENT DOCUMENTS

| 6,080,063 | A | 6/2000 | Khosla | |
|---|---|---|---|---|
| 6,508,709 | B1* | 1/2003 | Karmarkar | ............ G07F 17/32 463/40 |
| 7,823,066 | B1 | 10/2010 | Kuramura | |
| 7,824,268 | B2 | 11/2010 | Harvey et al. | |
| 9,042,708 | B2 | 5/2015 | Caldwell et al. | |
| 9,787,113 | B2 | 10/2017 | Kim et al. | |
| 10,560,502 | B2 | 2/2020 | Kieft et al. | |
| 10,652,293 | B2 | 5/2020 | Kieft et al. | |
| 10,999,338 | B2 | 5/2021 | Kieft et al. | |
| 11,240,279 | B2 | 2/2022 | Kieft et al. | |
| 2006/0112325 | A1 | 5/2006 | Ducheneaut et al. | |
| 2007/0005794 | A1* | 1/2007 | Graham | .............. H04L 65/1101 709/231 |

(Continued)

OTHER PUBLICATIONS

"https://www.telestream.net/wirecast/overview.html—Telstra Wirecast Wirecast—Live video streaming production software for Mac & PC 10 pages—retrieved from Internet Aug. 17, 2018.".

(Continued)

*Primary Examiner* — Jude Jean Gilles
(74) *Attorney, Agent, or Firm* — Hamilton, Brook, Smith & Reynolds, P.C.

(57) ABSTRACT

Embodiments are directed to computer systems and methods that stream selected media content to a client device. Selection of particular content to stream to a device of a given user is performed based on parameters specified in advance by the given user. Selection is made from received content that is parsed, indexed, and stored in real-time in such a way as to allow for real-time monitoring and searching of the content according to the user-specified parameters. The user is alerted as to the discovery of the selected content and enabled to connect to a stream presenting the selected content. The selected content is presented within the stream beginning from a playback time corresponding to a moment that triggered the discovery of the selected content, even if the moment has passed, thus providing the user with a comprehensive presentation of the selected content.

22 Claims, 10 Drawing Sheets

(56) References Cited

U.S. PATENT DOCUMENTS

| | | | |
|---|---|---|---|
| 2010/0166298 A1* | 7/2010 | Paquier | G06V 10/454 |
| | | | 382/158 |
| 2010/0166315 A1* | 7/2010 | Paquier | G06K 9/6267 |
| | | | 382/190 |
| 2010/0166320 A1* | 7/2010 | Paquier | G06V 10/451 |
| | | | 382/209 |
| 2010/0247082 A1 | 9/2010 | Caldwell et al. | |
| 2011/0066746 A1 | 3/2011 | Bennett | |
| 2011/0083073 A1 | 4/2011 | Atkins et al. | |
| 2012/0144435 A1* | 6/2012 | Spilo | H04N 21/43615 |
| | | | 725/78 |
| 2014/0007170 A1 | 1/2014 | Klappert et al. | |
| 2014/0010515 A1 | 1/2014 | Lee et al. | |
| 2014/0379868 A1 | 12/2014 | Nault | |
| 2015/0172727 A1* | 6/2015 | Annamraju | H04N 19/124 |
| | | | 375/240.25 |
| 2016/0014477 A1 | 1/2016 | Siders | |
| 2018/0270284 A1 | 9/2018 | Lee et al. | |
| 2019/0068664 A1 | 2/2019 | Kieft et al. | |
| 2019/0068665 A1* | 2/2019 | Kieft | H04L 67/75 |
| 2020/0304548 A1 | 9/2020 | Kieft et al. | |
| 2020/0322401 A1 | 10/2020 | Kieft et al. | |
| 2021/0227008 A1 | 7/2021 | Kieft et al. | |

OTHER PUBLICATIONS https://helpx.adobe.com/media-encoder/user-guide.html—Adobe Live Media Encoder "Adobe Media Server Professional" 4 pages—retrieved from Internet Aug. 17, 2018.
https://www.newtek.com/tricaster/—"NewTek TriCaster", 9 pages—retrieved from Internet Aug. 17, 2018.
https://zoom.us/webinar—"Zoom Video Webinar", 3 pages—retrieved from Internet Aug. 17, 2018.
https://www.pexip.com/pexip-infinity-connect—"Pexip Infinity", 5 pages—retrieved from Internet Aug. 17, 2018.
https://www.wowza.com/products/streaming-engine—"Wowza Streaming Engine", 2 pages—retrieved from Internet Aug. 17, 2018.
https://www.adobe.com/products/adobe-media-server-professional.html—"Adobe Media Server", 2 pages—retrieved from Internet Aug. 17, 2018.
https://www.brightcove.com/en/live—"Brightcove Live Streaming Service", 7 pages—retrieved from Internet Aug. 17, 2018.
https://www.brightcove.com/en/zencoder—"Brightcove Zencoder Live Transcoding", 6 pages—retrieved from Internet Aug. 17, 2018.
https://aws.amazon.com/medialive/—"AWS Elemental MediaLive", 6 pages—retrieved from Internet Aug. 17, 2018.
https://www.wowza.com/products/streaming-cloud—"Wowza Streaming Cloud", 6 pages—retrieved from Internet Aug. 17, 2018.
https://www.encoding.com/live/, 6 pages—retrieved from Internet Aug. 20, 2018.

\* cited by examiner

AUTOMATIC DISCOVERY AND REPORTING OF STREAMING CONTENT OF INTEREST AND CONNECTION OF USER TO SAME

RELATED APPLICATIONS

This application is related to U.S. application Ser. No. 16/843,661, filed Apr. 8, 2020, and to U.S. application Ser. No. 17/223,634, filed Apr. 6, 2021, both of which are incorporated by reference in their entirety.

BACKGROUND

Streaming video and audio services have recently come into more widespread use in increasingly diverse applications, including virtual event hosting, teleconferencing, and entertainment. A product of this proliferation of streaming applications has been an extensive expansion in video and audio content available for streaming. As users of various streaming services seek to identify and connect with content of interest from a potentially vast and ever-growing array of available content, streaming services have sought to provide interfaces that facilitate such connection.

SUMMARY

Embodiments of the present invention provide an approach for managing video and audio content that is available for streaming, and that may be of interest to a user. The approach enables users to specify content parameters according to their interests, to receive alerts when such content is available, and to connect, via a client device, to a media stream carrying an element of such content in order to examine and consume the content.

Embodiments of the present invention are directed to computer systems, methods, and program products for pro-actively identifying content of interest to users, and for streaming selected media content to client devices of these users.

The computer system embodiments include a streaming media server. In some embodiments, the streaming media server is one of: Wowza Streaming Engine, Adobe Media Server, or a cloud-hosted SaaS/PaaS provider, including one of: Brightcove Live Streaming Service, Knovio Live, Microsoft Stream, Zencoder Live Transcoding, Encoding.com Live Cloud Encoding, AWS Elemental MediaLive, Wowza Streaming Cloud, or such. In some embodiments, the computer systems (e.g., streaming media server component), methods, and program products receive an input media stream from a media encoder. The media encoder captures and encodes input content from the source device into the input media stream. In some embodiments, the media encoder is implemented as one of a software-based media encoder, a hardware-based media encoder, or a cloud-based media encoder. In example embodiments, the media encoder is one of: Telstra Wirecast, Adobe Live Media Encoder, NewTek TriCaster, Zoom Video Webinar, Pexip Infinity, or such. In some embodiments, the input is at least one of video and audio, and the source devices are at least one of: camera, video player, or microphone. The media encoder encodes the captured input to a standard media format, such as MPEG-4, H.264, and the like. In some embodiments, the media encoder transmits the encoded input as a stream, using a real-time streaming protocol, to the streaming media server. The real-time streaming protocol may be one of: Real-Time Messaging Protocol (RTMP), Real-Time Streaming Protocol (RTSP), Web Real-Time Communications (WebRTC), and such.

In some embodiments, the encoded input content may be generated by a plurality of source devices, which plurality of source devices may be individually or otherwise distributively deployed in a plurality of separate physical locations. In such embodiments, the media encoder may generate a plurality of input media streams, which may individually correspond with respective source devices, and which may be received by the streaming media server simultaneously. In other embodiments, a source device or a plurality thereof may generate various input media streams at different times, to be gathered, e.g., recorded, and managed as a group by the systems (e.g., streaming media server), methods, and program products.

The computer systems (e.g., streaming media server component), methods, and program products perform operations to process the encoded input content of the input media stream. The processed encoded input content may include identifiers for respective individual content elements and time-stamps assigned to the respective individual content elements according to a playback time at which each individual content element manifests within the input media stream. The processed encoded input content, including the individual content elements and respective assigned time-stamps, is stored in a content element file. In some embodiments, the operations include processing operations performed locally, such as by components (e.g., streaming media server component) of the computer systems, modules employed by the methods, and elements executing instructions of the computer program products. It should be appreciated that "locally" may herein refer to distributed, embedded, or other possible processing architectures within the scope of the present disclosure. In some embodiments, the operations may include transmission of the content element file to a third-party processing service, such as a voice-to-text transcription service (e.g., Amazon Web Services (AWS) Transcribe or Google Cloud Speech-To-Text. In embodiments wherein the operations include transmission of the encoded input content to a third-party service as described hereinabove, the operations further include transmission of the content element file from the third-party service to the components (e.g., streaming media server), the modules employed by the methods, or the elements executing instructions of the computer program products, as the case may be. In any of the aforementioned embodiments, the content element file includes the individual content elements, and respective assigned time-stamps, to allow the computer systems (e.g., streaming media server), methods, and program products to search and/or monitor the content element file as described hereinbelow.

The computer systems (e.g., streaming media server component), methods, and program products continue by receiving an alert request from a client device of a user. The alert request specifies a potential content element in which the user may hold interest. The computer systems (e.g., streaming media server component), methods, and program products monitor the content element file for an instance of the potential content element by loading and executing comparison instructions representing a real-time search engine. The real-time search engine compares the potential content element with the stored individual content elements. The real-time search engine facilitates selection of a given content element of the stored individual content elements upon determining that the given content element substantially matches the potential content element according to the matching. The real-time search engine may be configured to make the selection automatically, or may enable the user to make the selection manually.

The computer systems (e.g., streaming media server component), methods, and program products generate and transmit, to the client device, an alert corresponding to the selected given content element. The alert includes a prompt enabling the client device to connect to the input media stream via the streaming media server. In some embodiments, the alert is one of: a text message, e-mail, mobile push notification, on-screen notification, or such.

The computer systems (e.g., streaming media server component), methods, and program products transcode the input media stream in a streaming format compatible with content delivery. The transcoded media stream is the output stream. In some embodiments, the media stream is transcoded by the streaming media server using a Hypertext Transfer Protocol (HTTP) protocol that is one of: HTTP Live Streaming (HLS), MPEG-DASH, or such.

The computer system embodiments also include a multimedia player coupled to the streaming media server and executing on the client device. In some embodiments, the multimedia player runs in one of: a web browser, a mobile application, or such on the client device. The computer systems (e.g., multimedia player component), methods, and program products load the output media stream from a location parsed from the content element file. The computer systems (e.g., multimedia player component), methods, and program products cue playback of the output media stream to a playback time based on the time-stamp assigned to the selected given content element. The computer systems (e.g., multimedia player component), methods, and program products start playback of the output media stream, presenting the output media stream to the user.

In some computer system embodiments, the individual content elements include individual spoken words, or groups thereof, received audibly within the encoded input content. In some embodiments, the individual content elements include aspects of individual spoken words, or groups thereof. In example embodiments, such aspects are at least one of topic, tone, sentiment, and volume. In some embodiments, the individual content elements include individual written words, or groups thereof, received visually within the encoded input content. Written words received may be presented within the individual content elements, for example, upon slides, such as lecture slides or presentation slides, included with an input media stream. Such slides may be included, for example, via video capture of an overhead-projected representation thereof, or via direct juxtaposition or overlay of a digital representation of such slides with other content of the input media stream. In some embodiments, the individual content elements include aspects of individual written words, or groups thereof, including topic. In some embodiments, the individual content elements include images received visually within the encoded input content. In some embodiments, the individual content elements include aspects of images, including types. In example embodiments, such types are at least one of photographs, technical data plots, and financial data plots. In other example embodiments, such types may include lecture slides or presentation slides, which may contain written words as described hereinabove.

In some computer system embodiments, the streaming media server includes an artificial intelligence (AI) module. The AI module may be configured to use machine learning to perform at least one of the operations to process the encoded input content and the searching and/or monitoring of the content element file. In some embodiments, the streaming media server includes an optical character recognition (OCR) module. The OCR module may be configured to identify individual content elements received visually. For example, the streaming media server may employ the OCR module to recognize written words presented upon lecture slides or presentation slides included in the input media stream.

In some embodiments, the output media stream is a live stream. The live stream may be buffered or unbuffered. In some embodiments, the output media stream is a stored media segment. In some embodiments, the output media stream is a video stream formatted as one of: MPEG-4, Windows Media, QuickTime, Audio Video Interleave (AVI), and the like. In these embodiments, the video stream may be at least one of transcoded and transmitted over the network using HTTP Live Streaming (HLS) protocol, MPEG-DASH protocol, or another streaming protocol.

In some computer system embodiments, the playback time is an initial playback time. In these embodiments, the computer systems (e.g., streaming media server component), methods, and program products computationally select a new playback time of the output media stream. In these embodiments, the new playback time is different from the initial playback time. The new playback time may be static or dynamic. In these embodiments, the computer systems (e.g., streaming media server component), methods, and program products adjust playback of the output media stream such that the present playback time beginning at the initial playback time approaches the new playback time. In these embodiments, the computer systems (e.g., streaming media server component), methods, and program products monitor the present playback time of the output media stream as adjusted, including by polling the content element file based on the present playback time as adjusted.

In some instances, the user may not wish to immediately connect the client device to a given input media stream. Furthermore, even if the user were to so connect immediately, the moment of interest may already have passed. As such, upon activation of the link in the alert by the user, embodiments may connect the client device to the input media stream of the given presentation track at a playback time that is earlier than the present time. Subsequently, embodiments may respond to user actuation of various playback controls to adjust playback of the output media stream generated by the streaming media server as described hereinbelow. Such actuation of playback controls may enable the user to consume contextual information surrounding a topic of interest presented within the given input media stream.

In some computer system embodiments, adjusting playback of the output media stream includes restarting the output media stream at a frame of the output media stream corresponding to the new playback time, such that the initial playback time is the same as the new playback time. In these embodiments, adjusting playback of the output media stream also includes presenting the media stream at the multimedia player beginning with the restarted frame corresponding to the new playback time. In some embodiments, adjusting playback of the output media stream includes automatically or manually rewinding the output media stream to an earlier playback time in an available timeline for the output media stream, or forwarding the output media stream to a later playback time in the available timeline. In some embodiments, adjusting playback of the output media stream includes controlling a playback rate parameter. In some embodiments, adjusting playback of the output media stream includes updating a displayed ancillary element associated with the output media stream to be displayed according to the monitored present playback time.

Some computer-implemented method embodiments stream selected media content to a client device of a user. In computer-implemented method embodiments, the method performs operations to implement any embodiments or combination of embodiments described herein.

Some computer program product embodiments include a non-transitory computer-readable medium having computer-readable program instructions stored thereon. In some computer program product embodiments, the instructions, when executed by a processor, cause the processor to implement any embodiments or combination of embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

The teachings of all patents, published applications and references cited herein are incorporated by reference in their entirety.

Digital Processing Environment

Figure 1A:
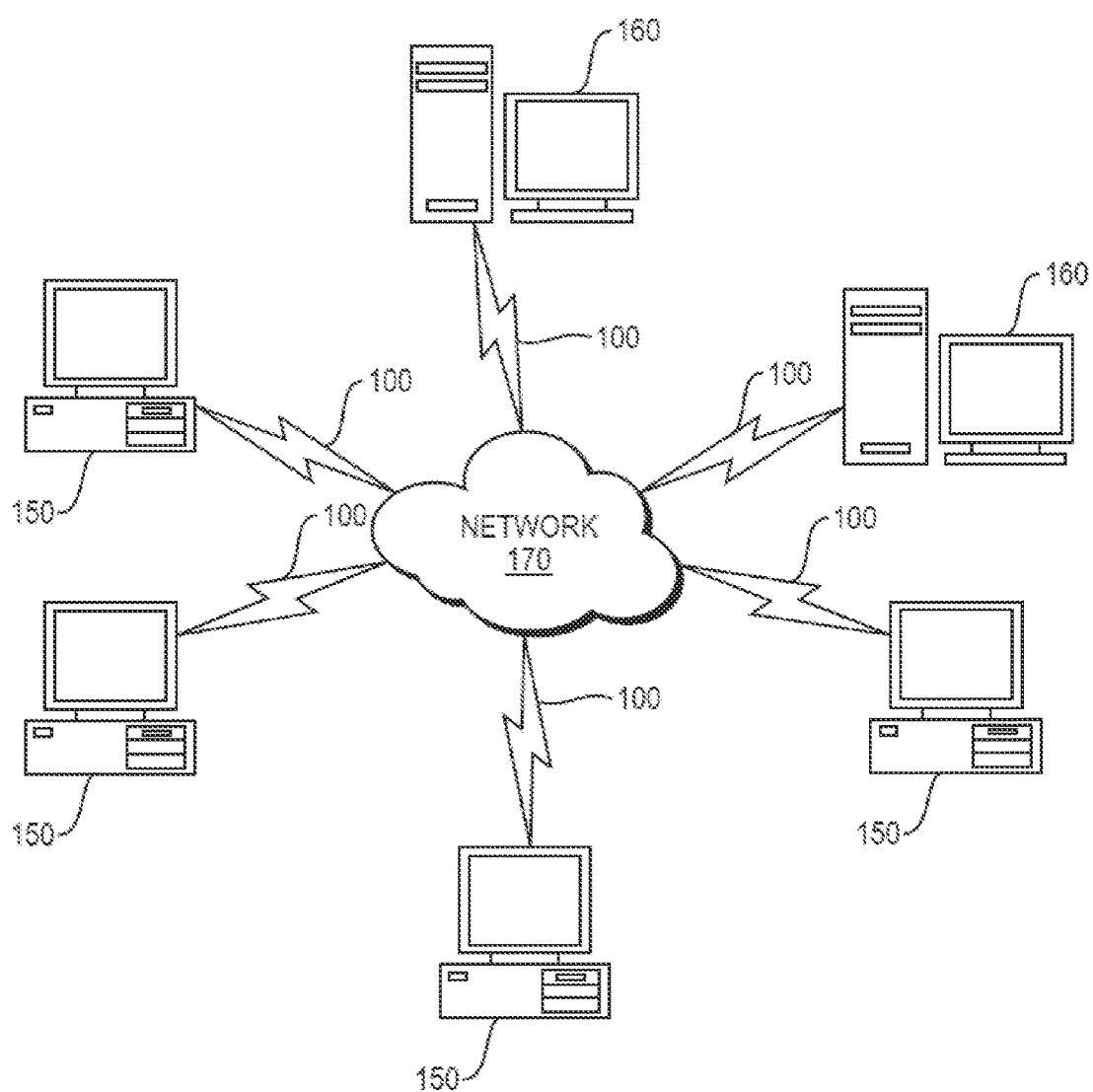
FIG. 1A is a schematic diagram of an example computer network environment in which embodiments of the present invention are deployed.

Example implementations of a multimedia system 100 for streaming selected media content to a client device 150 of a user may be implemented in a software, firmware, or hardware environment. FIG. 1A illustrates one such environment. One or more client devices 150 (e.g. a mobile phone) and a cloud 160 (or server computer or cluster thereof) provide processing, storage, and input/output devices executing application programs and the like. Client devices may herein be referred to interchangeably as client computers.

Client devices 150 are linked through communications network 170 to other computing devices, including other client devices/processes 150 and server computer(s) 160. Communications network 170 can be part of a remote access network, a global network (e.g., the Internet), an out-of-band network, a worldwide collection of computers, Local area or Wide area networks, cloud networks, and gateways that currently use respective protocols (TCP/IP, HTTP, Bluetooth, etc.) to communicate with one another. Other electronic device/computer network architectures are suitable.

Figure 2A:
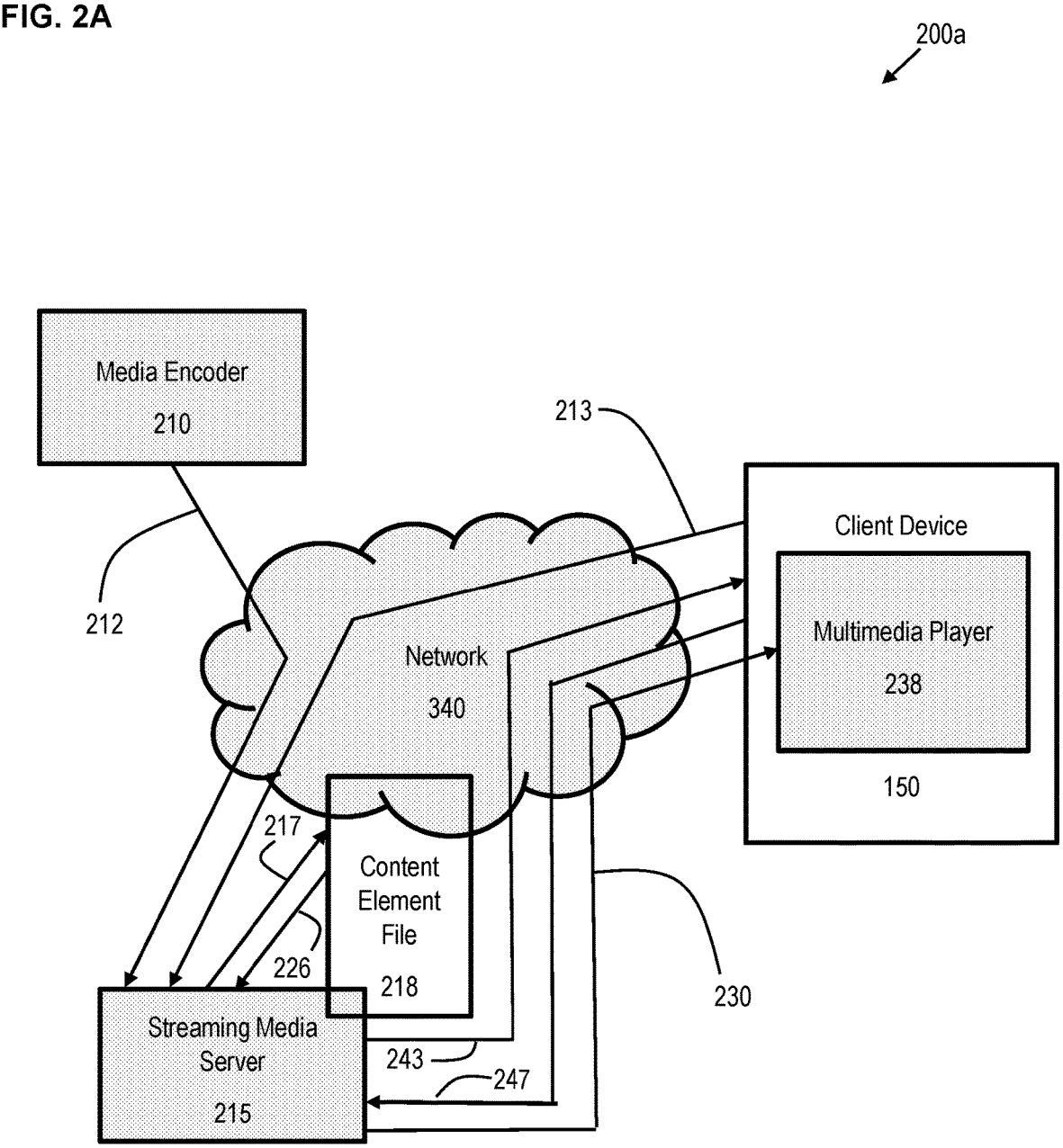
FIGS. 2A-2C are block diagrams of a system for streaming selected media content to a client device of a user according to embodiments of the present invention.

Server computers 160 may be configured to implement a streaming media server (e.g., 215 of FIG. 2A) for provisioning, formatting, and storing selected media content (such as audio, video, text, and images/pictures) of a presentation, which are processed and played at client devices 150 (such as multimedia player 238 in FIG. 2A). The server computers 160 are communicatively coupled to client devices 150 that implement respective media encoders (e.g., 210 of FIG. 2A) for capturing, encoding, loading, or otherwise providing the selected media content that is transmitted to the server computers 160. In one example embodiment, one or more of the server computers 160 are Java application servers that are scalable such that if there are spikes in traffic, the servers can handle the load increase.

Figure 1B:
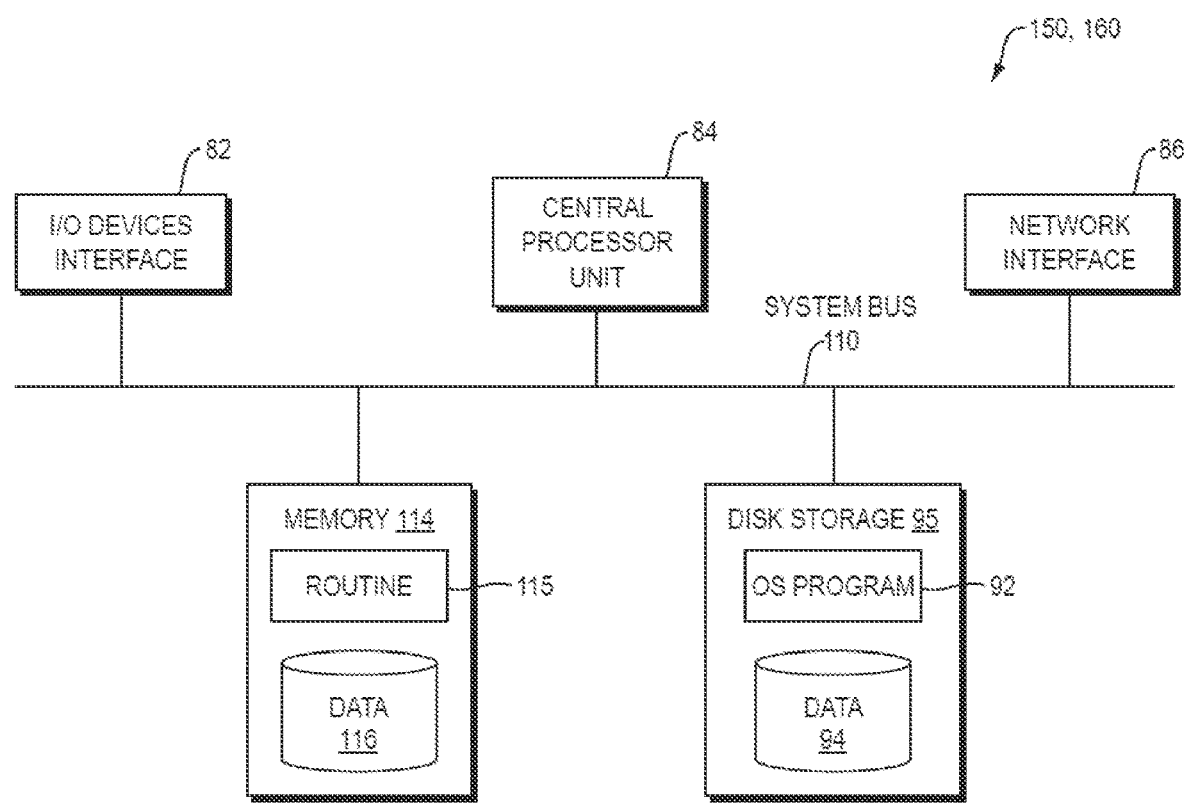
FIG. 1B is a block diagram of the computer nodes in the network of FIG. 1A.

FIG. 1B is a diagram of the internal structure of a computer/computing node (e.g., client processor/device/mobile phone device/tablet 150 or server computers 160) in the processing environment of FIG. 1A, which may be used to facilitate displaying such audio, video, image, or data signal information. Each computer 150, 160 contains a system bus 110, where a bus is a set of actual or virtual hardware lines used for data transfer among the components of a computer or processing system. Bus 110 is essentially a shared conduit that connects different elements of a computer system (e.g., processor, disk storage, memory, input/output ports, etc.) that enables the transfer of data between the elements. Attached to system bus 110 is I/O device interface 82 for connecting various input and output devices (e.g., keyboard, mouse, touch screen interface, displays, printers, speakers, etc.) to the computer 150, 160. Network interface 86 allows the computer to connect to various other devices attached to a network (for example the network illustrated at 170 of FIG. 1A). Memory 114 provides volatile storage for computer software instructions 115 and data 116 used to implement a software implementation of the present invention (e.g. capturing/loading, provisioning, formatting, retrieving, downloading, and/or storing streams of selected media content and streams of user-initiated commands).

Disk storage 95 provides non-volatile storage for computer software instructions 92 (equivalently "OS program") and data 94 used to implement embodiments of the multimedia system 100 of the present invention. Central processor unit 84 is also attached to system bus 110 and provides for the execution of computer instructions.

In one embodiment, the processor routines 92 and data 94 are a computer program product, including a computer readable medium capable of being stored on a storage device 95, which provides at least a portion of the software instructions for the multimedia system 100. Instances of the player 307, real-time search engine 314, publisher 317, optical character recognition module 322, artificial intelligence module 323 (of FIGS. 3A-3C), and other software embodiments of the multimedia system 100 may be implemented as a computer program product 92, and can be installed by any suitable software installation procedure, as is well known in the art. In another embodiment, at least a portion of the multimedia system 100 instructions may also be downloaded over a cable, communication and/or wireless connection. In other embodiments, the multimedia system 100 software components may be implemented as a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the multimedia system 100 routines/program 92.

In alternate embodiments, the propagated signal is an analog carrier wave or digital signal carried on the propagated medium. For example, the propagated signal may be a digitized signal propagated over a global network (e.g., the Internet), a telecommunications network, an out-of-band network, or other network. In one embodiment, the propagated signal is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 150 may receive and read, such as by receiving the propagation medium and identifying a propagated signal embodied in the propagation medium, as described above for computer program propagated signal product.

The multimedia system 100 described herein may be configured using any known programming language, including any high-level, object-oriented programming language. A client computer/device 150 (e.g., multimedia player 238 of FIG. 2A) of the multimedia system 100 may be implemented via a software embodiment and may operate within a browser session. The multimedia system 100 may be developed using HTML, JavaScript, Flash, and such. The HTML code may be configured to embed the system into a web browsing session at a client 150. The Java Script can be configured to perform clickstream and session tracking at the client 150 (e.g., publisher 317 of FIG. 3B) and store the streaming media recordings and editing data in a cache. In another embodiment, the system may be implemented in HTML5 for client devices 150 that do not have Flash installed and use HTTP Live Streaming (HLS) or MPEG-DASH protocol. The system may be implemented to transmit media streams using a real-time streaming protocol, such as: Real-Time Messaging Protocol (RTMP), Real-Time Streaming Protocol (RTSP), Web Real-Time Communications (WebRTC), and the like. Components of the multimedia system 100 may be configured to create and load an XML, JSON, or CSV data file or other structured metadata file (such as a manifest file) with information about where and how components of the multimedia system 100 are stored, hosted, or formatted, such as timing information, size, footnote, attachments, interactive components, style sheets, etc.

In an example mobile implementation, the user interface framework for the components of the multimedia system 100 may be based on XHP, Javelin and WURFL. In another example mobile implementation for OS X and iOS operating systems and their respective APIs, Cocoa and Cocoa Touch may be used to implement the player 102 using Objective-C or any other high-level programming language that adds Smalltalk-style messaging to the C programming language.

System for Streaming

FIG. 2A is a block diagram of a system 200a for streaming selected media content to a client device of a user in an example embodiment of the present invention. The system 200a is an example implementation of the computer network environment 100 of FIG. 1A. In FIG. 2A, the system 200a includes components of a streaming media platform configured to divert attention of a user of the platform toward a media stream potentially of interest to the user. Live presentations, speeches, talks, panels, or other events may be live-streamed to or otherwise captured by a media encoder 210 of a video or audio streaming or recording system. Multiple simultaneous such events may be thus streamed or captured. A user of the streaming media platform may command the platform to issue an alert to the user, via a client device 150, as to coverage of a topic of interest, or as to any other occurrence in at least one of the events. For example, five, ten, twenty, or another number of simultaneous company presentations at an investor conference may be live-streamed to the media encoder 210, and a user may wish to be alerted as to a particular piece of content, e.g., spoken or visual content, being detected in a given media stream, so that the user may then connect the client device 150 to the given media stream for viewing or listening as the case may be. The user may thus connect to the stream live, or may connect to an on-demand stream of a previously recorded representation of the event at a later time or date. In either a live-streaming or on-demand configuration, a user may be enabled to view or listen to the given media stream beginning from the exact moment within the given media stream at which the platform discovered the particular piece of content and subsequently issued the alert, or at an earlier moment, such as, for example, 20 seconds before the appearance of the particular spoken content. The streaming media platform may identify the aforementioned exact moment of discovery of the particular piece of content based on a time-stamp corresponding to the exact moment or to a moment adjacent thereto. Such time-stamps may be assigned to the given media stream upon capturing or parsing same, and may be referenced upon encoding same for streaming so as to cue playback of the given media stream to a playback time based on a corresponding time-stamp.

The system 200a includes a media encoder 210 that captures, loads, or otherwise provides a live media stream (containing media content) representing an input media stream 212 to a streaming media server 215. In some embodiments, the media encoder 210 may be: Telstra Wirecast, Adobe Live Media Encoder, NewTek TriCaster, Zoom Video Webinar, Pexip Infinity, and the like. In some embodiments, the streaming media server 215 may be Wowza Streaming Engine, Adobe Media Server, or a cloud-hosted SaaS/PaaS provider, including one of: Brightcove Live Streaming Service, Zencoder Live Transcoding, Encoding.com Live Cloud Encoding, AWS Elemental MediaLive, Wowza Streaming Cloud, or such. The media content of the input media stream 212 may be audio and/or video, and the like. In example embodiments, the input media stream 212 may contain video content, which is being captured live (in real-time) from a source device such as a camera/recorder (e.g., webcam) configured on the media encoder 210, a camera/recorder communicatively coupled to the media encoder 210, or any other such live capture of video. In other embodiments, the video content of the input media steam 212 may be pre-recorded videos stored on the media encoder 210 or at a storage device communicatively coupled to the media encoder 210, a live video feed from a web link accessible from the media encoder 210, and such.

In some embodiments, the media content of the input media stream 212 may be generated by a plurality of source devices, which plurality of source devices may be individually or otherwise distributively deployed in a plurality of separate physical locations. In such embodiments, the media encoder 210 may generate a plurality of input media streams 212, which may individually correspond with respective source devices, and which may be received by the streaming media server 215 simultaneously. In other embodiments, a source device or a plurality thereof may generate various input media streams at different times, to be gathered, e.g., recorded, and managed as a group by the systems (e.g., streaming media server), methods, and program products. In an example embodiment, a streaming media server 215 is configured to enable a coordinator of an investor conference to transmit media representations of ten simultaneous presentation tracks, occurring in ten different rooms at the conference location, to client devices. However, users of the client devices may wish to view a subset of the simultaneous presentation tracks; or, users may prefer to remain disengaged until alerted as to an instance of a content element of interest. The computer systems, methods, and program products facilitate such media transmission by conference coordinators, and subsequent consumption of associated content by users of client devices, as described hereinbelow.

In example embodiments, the captured video content of the input video stream 212 may be formatted as MPEG-4, Windows Media, Quicktime, Audio Video Interleave (AVI), Flash, or any other video format without limitation. In some example embodiments, the input video stream 212 may also be transcoded (video encoded) or otherwise digitally converted into an output media stream 230 for transfer and use at the streaming media server 215 and multimedia player 238. The input video stream (or other media stream) 212 may be transferred to the streaming media server 215 and multimedia player 238 using Real-Time Messaging Protocol (RTMP) or HTTP Live Streaming (HLS) or other such streaming protocol.

The streaming media server 215 receives the (continuous) input media stream 212 from the media encoder 210 over network 340. The streaming media server 215 is configured to generate and maintain a metadata file or structure, to be referred to herein as a content element file 218, that maintains all references to older media segments while gaining new references, throughout the full duration of the stream (e.g., 2 hours). The content element file 218 may be stored on the streaming media server 215, on a device accessible via the network 340, or may be split or otherwise distributed among a combination thereof. The streaming media server 215 determines a dedicated memory location (e.g., directory or folder) for storing the input media stream 212. The streaming media server 215 provisions the received input media stream 212 for playback on multimedia player 238. The streaming media server 215 transcodes the input media stream 212 into segments or packets of a target time length, to be referred to herein as content elements 217, which are stored at the dedicated memory location. The content element file 218 may be formatted as, for example, a text, XML, or CSV file, with information on content elements 217 of the input media stream 212, including time-stamps indicating a date and time of original creation of each content element at a source device. The information stored in the content element file 218 may further include information on each content element such as where stored, where hosted, an identifier, date, time, size (time length), and the like. The stored content elements and content element file 218 may be structured according to the player configuration of the multimedia players 238, such as in HTML5-capable browser client.

The streaming media server 215 receives an alert request 213 from the user via the client device 150. The alert request may include, for example, Boolean search parameters, or parameters describing a decision to be made based on a fuzzy multiple-criteria decision-making technique. The streaming media server 215 monitors the content element file 218 for an instance of a potential content element based on the alert request 213. The streaming media server 215 may perform such monitoring by searching text associated with the potential content elements for keywords. Such text may be derived from transcription of spoken content of the content elements 217, or from visually recognized text within an image or video of the content elements 217, such as by optical character recognition (OCR). Upon discovery of a given content element 226 that substantially matches the potential content element specified in the alert request 213, the streaming media server 215 retrieves the given content element 226 from the content element file 218. The streaming media server 215 generates and transmits an alert 243 to the client device 150 corresponding to the selected given content element 226. The alert 243 includes a prompt enabling the client device 150 to connect to the input media stream 212 via the streaming media server 215. In response to the prompt, the user may issue a command to connect 247 to the input media stream 212 via the streaming media server 215. The alert 243 may include sufficient context to enable the user to evaluate the alert and decide whether or not to issue the command to connect 247 to the input media stream 212 via the streaming media server 215. Such context may include time and location of the subject event, a name of a participant in the event, and other information describing the event. The streaming media server 215 transcodes the input media stream 212 in a streaming format compatible with content delivery. The transcoded media stream is the output media stream 230.

Some embodiments include a user feedback system to rate aspects of the alerts 243 such as accuracy or relevance. Such a feedback system may enable tuning of future alerts for improved relevance. In some embodiments, a user may set a relevance threshold to determine whether or not a particular alert should be sent to the client device 150. Alerts thus held back may still be retained in memory for later viewing, or may be collected and sent to the client device 150 periodically, or upon reaching a specified level of accumulation, rather than immediately.

Based on the content element file 218, the multimedia player 238 retrieves the (continuous) output media stream 230 from the streaming media server 215, and may cache the output media stream 230 at the multimedia player 238. Permissions may be required for a user to access certain individual content elements 217, or to connect to certain input media streams 212. The multimedia player 238 displays the output media stream 230 at a client device 150 via respective media players (e.g., HTML5 Video Player or the like) configured on the multimedia players 238 via a web browser. The output media stream 230 may be displayed in a first window or panel of a multimedia player 238.

The multimedia player 238 may synchronize ancillary items including commands and on-screen events to an output media stream 230 even if the output media stream 230 is paused, "rewound", "forwarded," or otherwise adjusted in time, such as watching a digital video recorder (DVR). That is, a user may adjust the output media stream 230 to a new time (a different time than the current playback time of the output media stream 230) or stop and later re-start the output media stream 230. For example, the output media stream 230 may have an available timeline ranging from (a) time of a first frame of the selected given content element 226 to (b) time of a current last frame of the selected given content element 226 stored at the streaming media server 215. The user may select a new time anywhere on the available timeline to rewind, forward, or otherwise adjust and restart playback of the output media stream 230. For another example, the user may interact with a visual element (on-screen event) displayed on the multimedia player 238, which causes the multimedia player 238 to re-cue/adjust the output media stream 230 to a new selected time that is associated with the visual element. The multimedia player 238 may store in memory (e.g., in a cookie) the current playback time prior to adjustment to the new selected time, and later choose an option to re-adjust playback time back to the stored current playback time.

The multimedia player 238 may synchronize the on-screen events (visual elements) displayed on the interfaces of the multimedia player 238 to the adjusted new playback time of the output media stream 230. For example, if the output media stream 230 is paused/restarted after a delay or rewound to a point/moment in time earlier in the output media stream 230, the multimedia player 238 synchronizes the on-screen events (visual elements) to the earlier point/moment of the output media stream 230. A user may also select an on-screen event associated with an earlier point in the output media stream 230, and embodiments re-cue the current playback of the output media stream 230 to the time of the selected visual element and synchronize the other on-screen events to the adjusted playback time of the output media stream 230.

To synchronize to the adjusted (e.g., "rewound" or paused/restarted) new time of the output media stream 230, the multimedia player 238 updates the current playback time of the output media stream 230 to the adjusted time, and restarts the output media stream 230 at the current playback time as adjusted. In some embodiments, multimedia player 238 restarts the output media stream 230 at a frame of a stored media segment at the streaming media server 215 corresponding to the new time, and presents the output media stream 230 at the multimedia player 238 beginning with the restarted frame corresponding to the new selected time. The multimedia player 238 then monitors the current playback time of the output media stream 230 as adjusted. As part of the monitoring, the multimedia player 238 polls the content element file 218 based on the current playback time as adjusted to determine corresponding one or more commands and executes the one or more commands to display on-screen events (visual elements) synchronized to the current playback time of the output media stream 230 as adjusted.

Figure 2B:
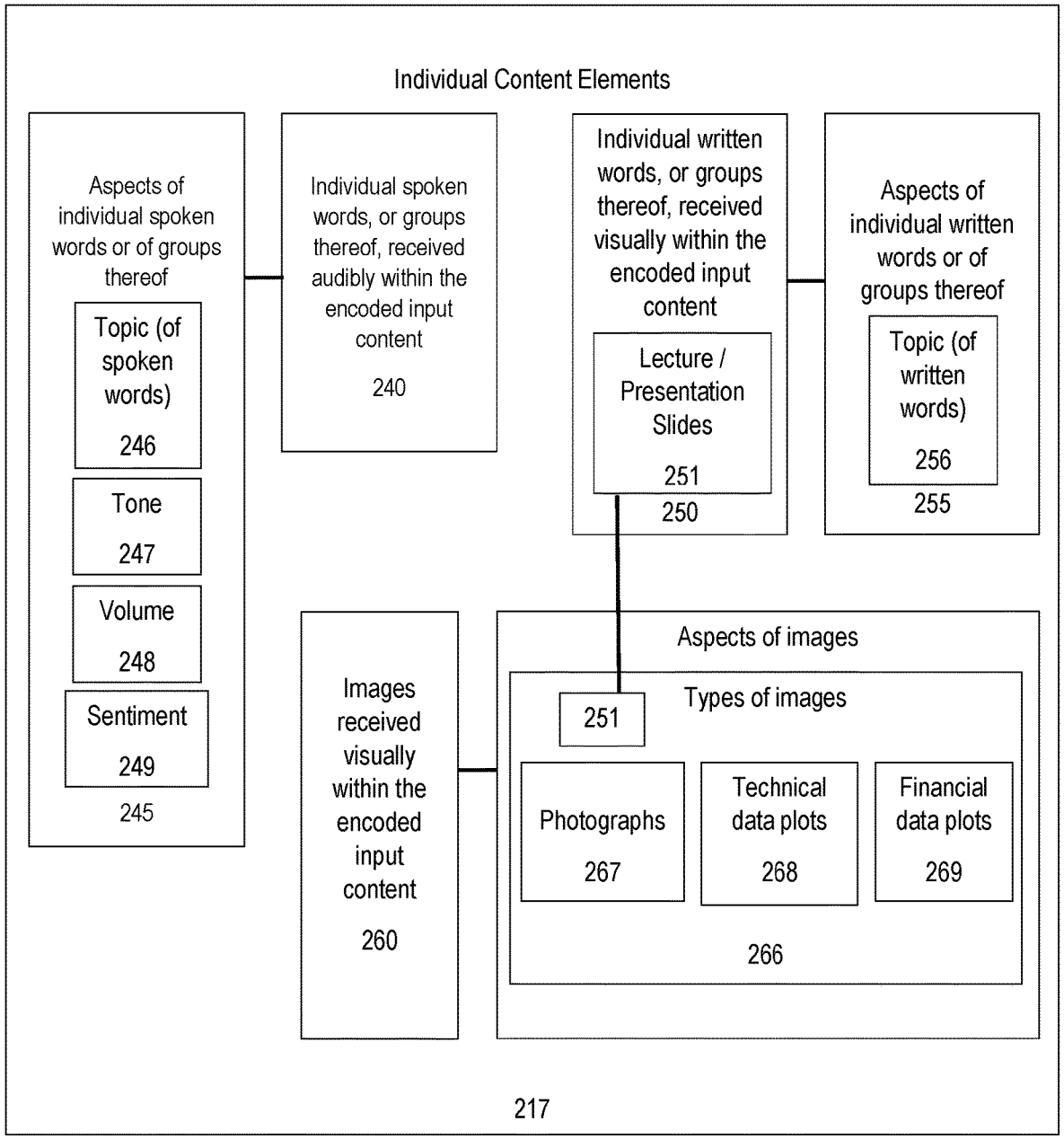

FIG. 2B is a block diagram 200b of examples of individual content elements 217 to be stored in the content element file 218 according to embodiments of the present invention. In some embodiments, individual content elements 217 include individual spoken words or groups thereof 240, received audibly within the encoded input content. The individual content elements 217 may include aspects of individual spoken words or groups thereof 245. Such aspects may include topic 246, tone 247, volume 248, and/or sentiment 249. For example, an alert might be set for whenever an argument breaks out with participants exhibiting raised voices or heated language. In some embodiments, individual content elements 217 may include individual written words or groups thereof 250, received visually within the encoded input content. The individual content elements 217 may include aspects of individual words or groups thereof 255. Such aspects may include topic 256. Such written words or groups thereof 250 may be received visually upon lecture slides or presentation slides 251 included in an associated input media stream 212. Such lecture slides or presentation slides 251 may, for example, present as a portion of recorded content of the associated input media stream 212, or may be otherwise digitally embedded within the associated input media stream 212. Such lecture slides or presentation slides 251 may be included, for example, via video capture of an overhead-projected representation thereof, or via direct juxtaposition or overlay of a digital representation of such slides with other content of the input media stream 212. In some embodiments, the individual content elements 217 may include images received visually 260 within the encoded input content. The individual content elements 217 may include aspects of images 265. Such aspects may include types 266. Such types may include photographs 267, technical data plots 268, and/or financial data plots 269. Such types may also include lecture slides or presentation slides 251 as described hereinabove. As such, it should be appreciated that individual content elements 217 may fall into more than one of the categories introduced herein, such as images of lecture slides containing written words.

Figure 2C:
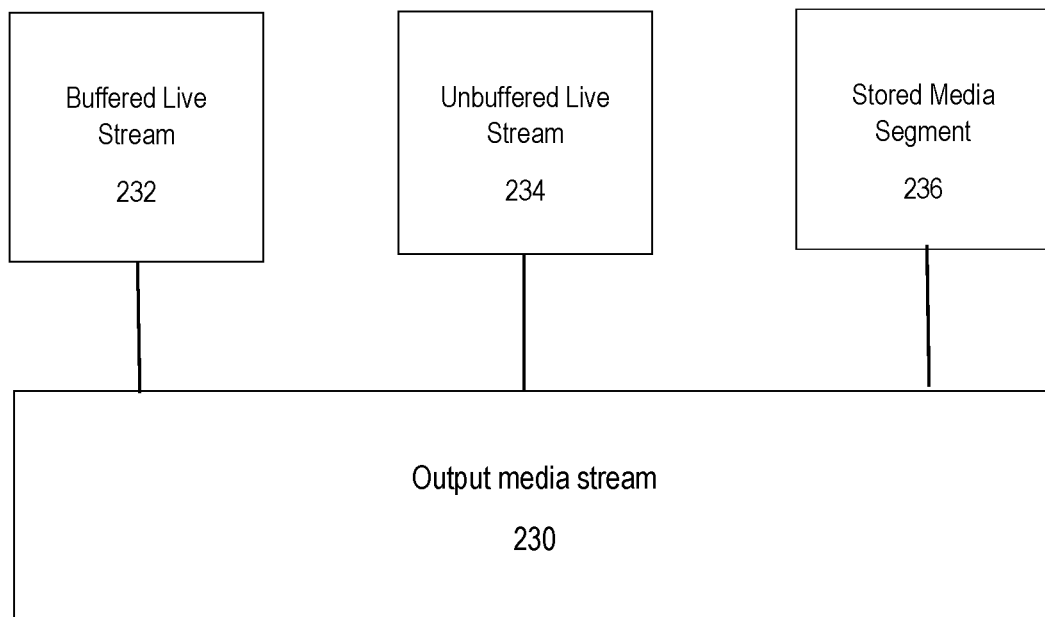

FIG. 2C is a block diagram 200c of example output media streams 230 in embodiments of the present invention. In some embodiments, the output media stream 230 may be a buffered 232 or unbuffered 234 live stream. In some embodiments, the output media stream 230 may be a stored media segment 236.

System Components for Streaming

Figure 3A:
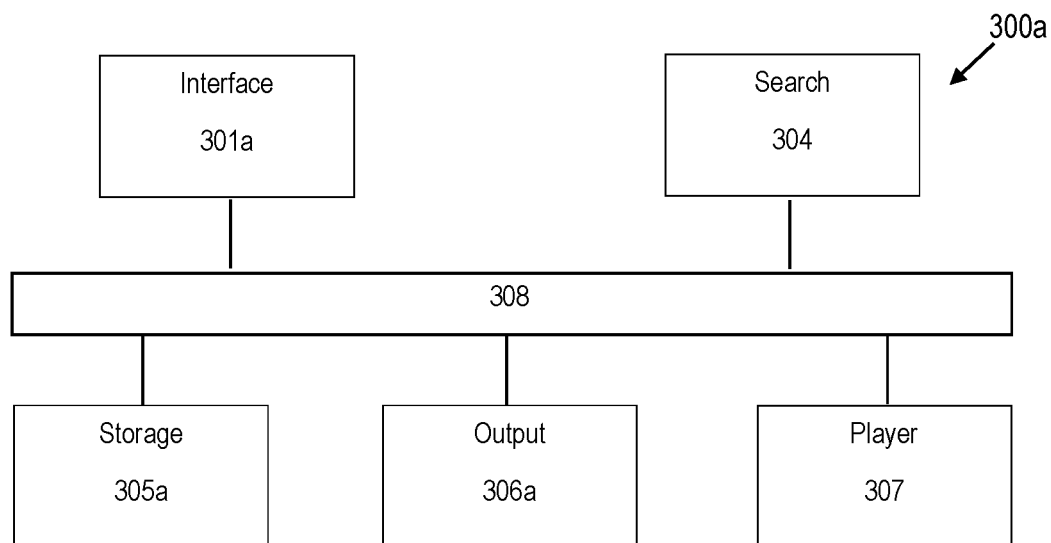
FIG. 3A is a block diagram of computer components of a multimedia player in embodiments of the present invention.

FIG. 3A is a block diagram 300a of example computer components of the multimedia player 238 of FIG. 2A in embodiments of the present invention. The multimedia player 238 includes an interface 301a configured to retrieve an output media stream 230 from a streaming media server 215. The multimedia player 238 includes storage 305a, which may retain or cache selected given content elements 226 of the output media stream 230 for later viewing, or to enable various playback controls such as pause and rewind. In some embodiments, such storage 305a may enable the user to control playback speed of the output media stream 230. For example, a user may wish to use a slower playback speed in order to examine a selected given content element 226 more closely, or a user may wish to use a faster playback speed in order to catch up to a live moment of a selected given content element 226 without missing any information imparted by the content element 226. Storage 305a may also retain a calculated playback time of the output media stream 230. The multimedia player 238 includes a player 307 configured to play the output media stream 230 (received via interface 301a) and a search engine 304 configured to locate a particular point in the output media stream 230. In some embodiments, the player 307 is a HTML5 Video Player using video.js. The multimedia player 238 also includes an output module 306a configured to display the output media stream 230. The output module 306a may trigger an on-screen event from a command received via interface 301. Data may travel among the various components shown in the diagram 300a of FIG. 3A via system bus 308.

Figure 3B:
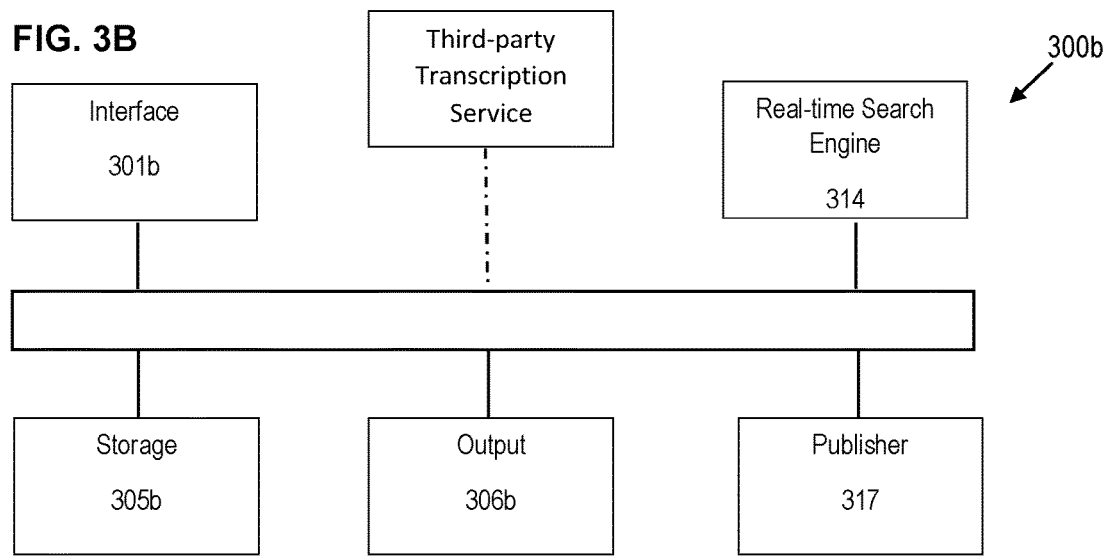
FIGS. 3B and 3C are block diagrams of computer components of a streaming media server in embodiments of the present invention.

FIG. 3B is a block diagram 300b of example computer components of the streaming media server 215 of FIG. 2A in embodiments of the present invention. The streaming media server 215 includes an interface 301b configured to retrieve an input media stream 212 from a media encoder 210. The streaming media server 215 includes storage 305b, which may host the content element file 218. The content element file 218 may alternatively be hosted remotely from the streaming media server 215, such as at another server on the network 340.

The streaming media server 215 can be seen in FIG. 3B to interface with a transcription service, as illustrated in the figure with a dotted line. The streaming media server 215 may transmit the encoded input content of the input media stream 212 to the transcription service. The transcription service is configured to assist with parsing of the input media stream 212, as encoded by the media encoder 210, into the individual content elements 217. Such parsing may include creation and indexing of a real-time speech-to-text transcription of the content of the input media stream 212. The transcription service may be a third-party transcription program such as, for example, Amazon Web Services (AWS) Transcribe or Google Cloud Speech-to-Text. The transcription service may thus identify individual content elements 217, assign a current time-stamp to the individual content elements 217, and store the individual content elements 217 and the respective assigned time-stamps in the content element file 218 to be transmitted back to the streaming media server 215. In some embodiments, the streaming media server 215 may interface with a third-party translation service (e.g., AWS Translate or Google Translate) (not shown in FIG. 3B). The streaming media server 215 may cause the content element file 218 to be transmitted to the translation service to produce a translated content element file in a specified language to be transmitted back to the streaming media server 215.

As can be seen in FIG. 3B, the streaming media server 215 further includes a real-time search engine 314. The real-time search engine 314 is configured to monitor the content element file for an instance of a potential content element as specified in a user alert request 213. The streaming media server 215 may thus load and execute comparison instructions representing the real-time search engine 314, in order to compare the potential content element with the stored individual content elements 217, and automatically select a given content element 226 of the stored individual content elements 217 upon determining that the given content element 226 substantially matches the potential content element according to the comparing. In some embodiments, a real-time search engine may be configured to curate a list of search results, allowing a user to choose from multiple media streams upon receipt of an alert 243.

The streaming media server 215 can be seen in FIG. 3B to also include a publisher 317 configured to enable the user to create, update, and load media content, such as audio, video, text, or graphic image content, and trigger a stream of commands on the loaded media content (such as, for loaded media content of a slide presentation, selecting a new slide). The multimedia player 238 also includes an output module 306b configured to display the output media stream 230. The output module 306b may trigger an on-screen event from a command received via interface 301b.

Figure 3C:
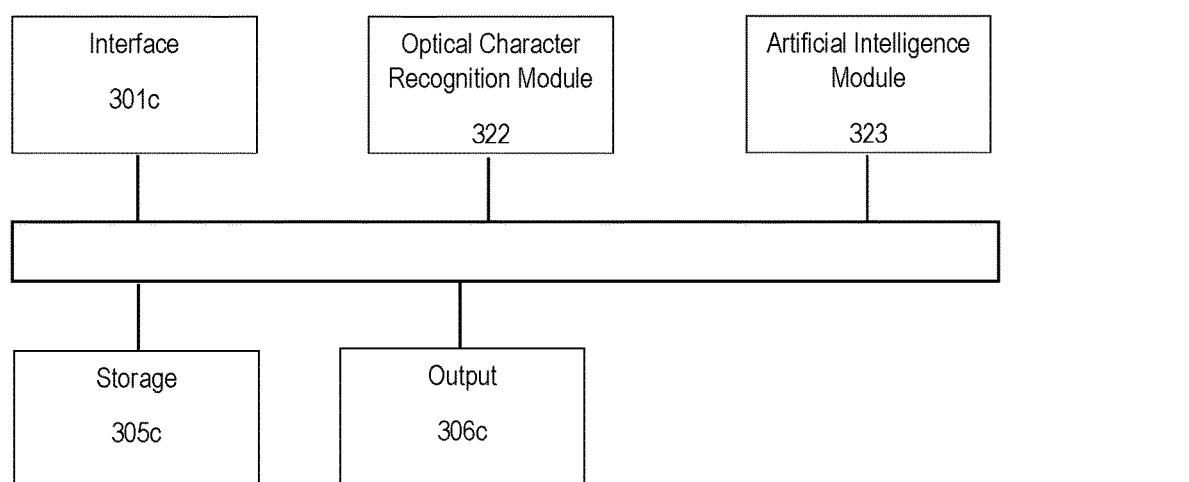

FIG. 3C is a block diagram 300c of example computer components of the streaming media server 215 of FIG. 2A in embodiments of the present invention. The streaming media server 215 of FIG. 3C can be seen to include an interface 301c, storage 305c, and an output module 306c as described with respect to corresponding components 301b, 305b, 306b of FIG. 3B. It can be seen in FIG. 3C that the streaming media server 215 also includes an optical character recognition (OCR) module 322. The OCR module 322 may be configured to identify the individual content elements 217. For example, the OCR module 322 may be configured to recognize written words presented upon lecture slides or presentation slides included within an associated input media stream 212. The streaming media server 215 may include an artificial intelligence module 323, which may use machine learning to support the streaming media server in parsing the encoded content of the input media stream 212, and in monitoring the content element file 218 for an instance of the potential content element.

In an example embodiment, an investor conference takes place covering alternative energy sources for automobiles, and the computer systems (e.g., streaming media server component), methods, or program products are configured to support video streams of presentations given at the conference. Given the present landscape within the field, it would be expected that such presentations would include a relatively high proportion of content relating to electric vehicles, while hydrogen-powered cars may be mentioned only occasionally. In the example embodiment, the computer systems (e.g., streaming media server component), methods, or program products receive an alert request from a client device of a user specifying that any time the word "hydrogen" is spoken, or is shown in writing on a presentation slide, across a plurality of video streams respectively representing a plurality of presentation tracks at the investor conference, the computer systems (e.g., streaming media server component), methods, or program products issue an alert to the client device via text message. To continue, a presenter of a given presentation track mentions "hydrogen," or, alternatively, an audience member asks a question mentioning "hydrogen." The computer systems (e.g., streaming media server component), methods, or program products, in parsing the encoded input content of the input media stream, receive, within a content element file, a representation of the word "hydrogen" from a transcription service, with a time stamp corresponding to the time at which the word was mentioned in the given presentation track. The time stamp may be, for example, "10:43:02 UCT," including a combination of an hour, minutes, seconds, and time standard/time zone, which may include a notation of local adjustment such as daylight saving time. The example embodiment continues with the computer systems (e.g., streaming media server component), methods, or program products detecting the representation of "hydrogen" in the content element file, and in response issue an alert to the client device via, for example, a text message. The alert may include a link to connect the client device, upon activation of the link by a user, to the input media stream of the given presentation track via an output media stream generated by the streaming media server.

Continuing to describe the example embodiment, the user may not wish to connect the client device to the input media stream of the given presentation track immediately. Furthermore, even if the user were to so connect immediately, the moment of interest may already have passed. As such, upon activation of the link in the alert by the user, for example, five minutes after the alert was received at the client device, the client device may be connected to the input media stream of the given presentation track at a playback time that is earlier than the present time, for example, corresponding to the beginning of the sentence in which "hydrogen" was mentioned. Subsequently, the user may actuate various playback controls to adjust playback of the output media stream generated by the streaming media server as described hereinbelow. Such actuation of playback controls may enable the user to consume contextual information surrounding the topic of interest presented within the given presentation track.

Method of Streaming

Figure 4A:
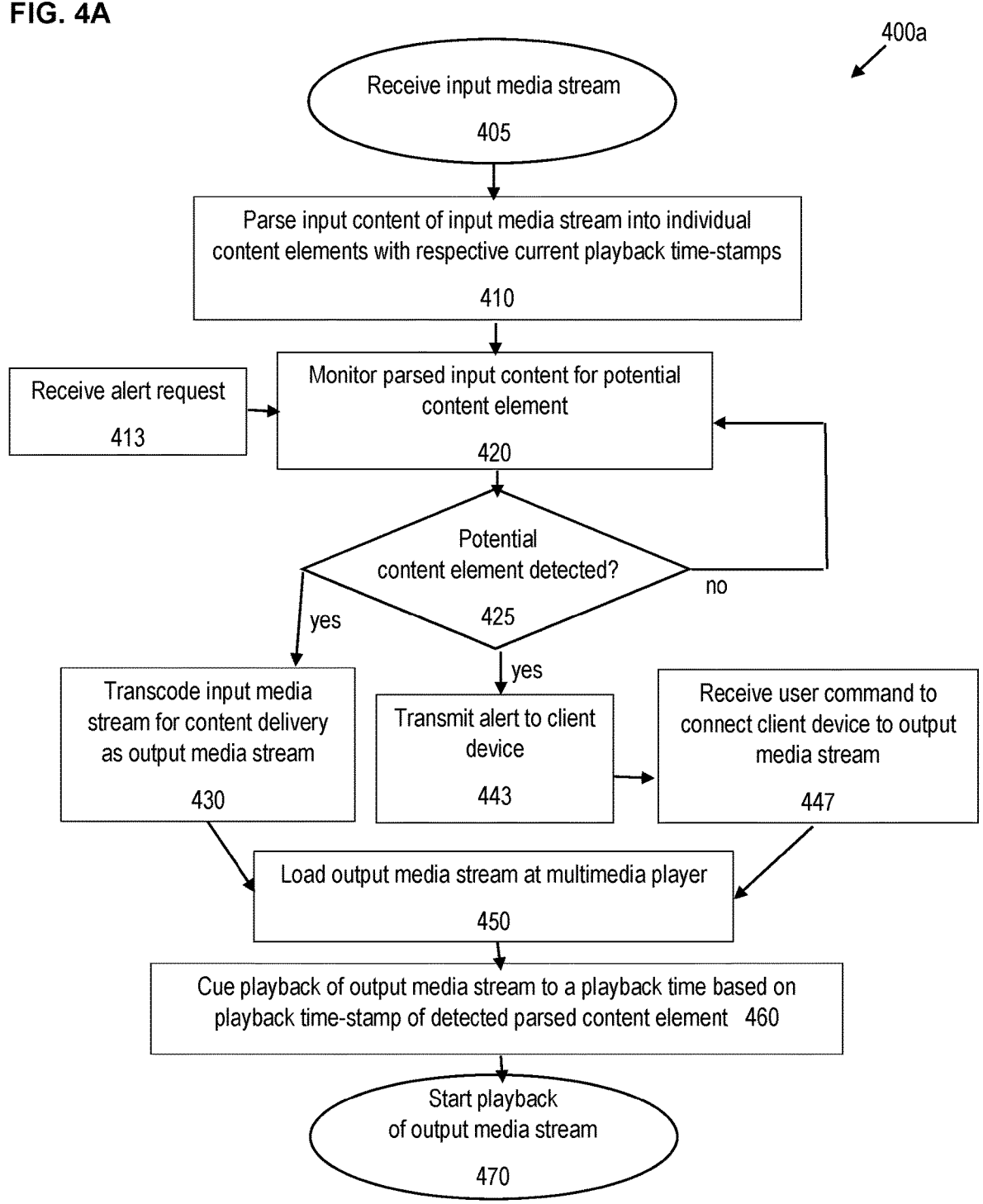
FIG. 4A is a flowchart of an example method of streaming selected media content to a client device of a user according to embodiments of the present invention.

FIG. 4A is a flowchart of an example method 400*a* of streaming selected media content to a client device 150 of a user according to embodiments of the present invention. The method 400*a* starts at step 405 by receiving an input media stream 212. The input media stream 212 may be received 405 from a media encoder 210. The media encoder 210 may capture and encode input content from a source device into the input media stream 212. The method 400*a* continues at step 410 by parsing input content of the input media stream 212 into individual content elements 217 with respective current playback time-stamps. The parsing step 410 may include transmitting the encoded input content of the input media stream 212 to a third-party processing service such as a transcription service. The transcription service may identify the individual content elements 217, which individual content elements may be words or phrases spoken aloud and captured within the input media stream 215. The transcription service may assign time-stamps to individual content elements 217 corresponding to a playback time at which the respective individual content elements 217 appear in the input media stream 215. The transcription service may store representations of the individual content elements 217 and associated time-stamps in a content element file 218. The transcription service may transmit the content element file back to the streaming media server 215. Alternatively, the streaming media server 215, may, for example via an OCR module 322 and/or artificial intelligence module 323, identify individual content elements 217 from the input media stream and store representations thereof, along with respective time-stamps corresponding to a playback time of the respective individual content elements 217, in a content element file 218 that may remain local to the streaming media server 215.

The method 400*a* continues by receiving an alert request 413 from a client device 150 of the user. The alert request received 413 may denote a specified potential content element. The method 400*a* continues by monitoring 420 the parsed input content for the potential content element. If the potential content element is not detected at step 425, the method 400*a* returns to step 420 and continues to monitor the parsed input content. If the potential content element is detected at step 425, the method 400*a* transcodes 430 the received input media stream 212 for content delivery as an output media stream 230 upon detection of the potential content elements. At step 425, the method 400*a* also transmits an alert 443 to the client device 150. The method 400*a* continues by receiving a user command 447 to connect the client device to the transcoded output media stream 430. The method 400*a* continues by loading 450 the transcoded output media stream 430 at a multimedia player 238. The method 400*a* continues by cueing playback 460 of the transcoded output media stream 430 to a playback time based on a playback time-stamp of the detected parsed content 410. The method 400*a* then starts playback 470 of the transcoded output media stream 430 from a moment in the output media stream 430 corresponding to the playback time-stamp of the detected parsed content 410. The detected parsed content 410 may herein be referred to interchangeably as the detected individual content element 217.

Figure 4B:
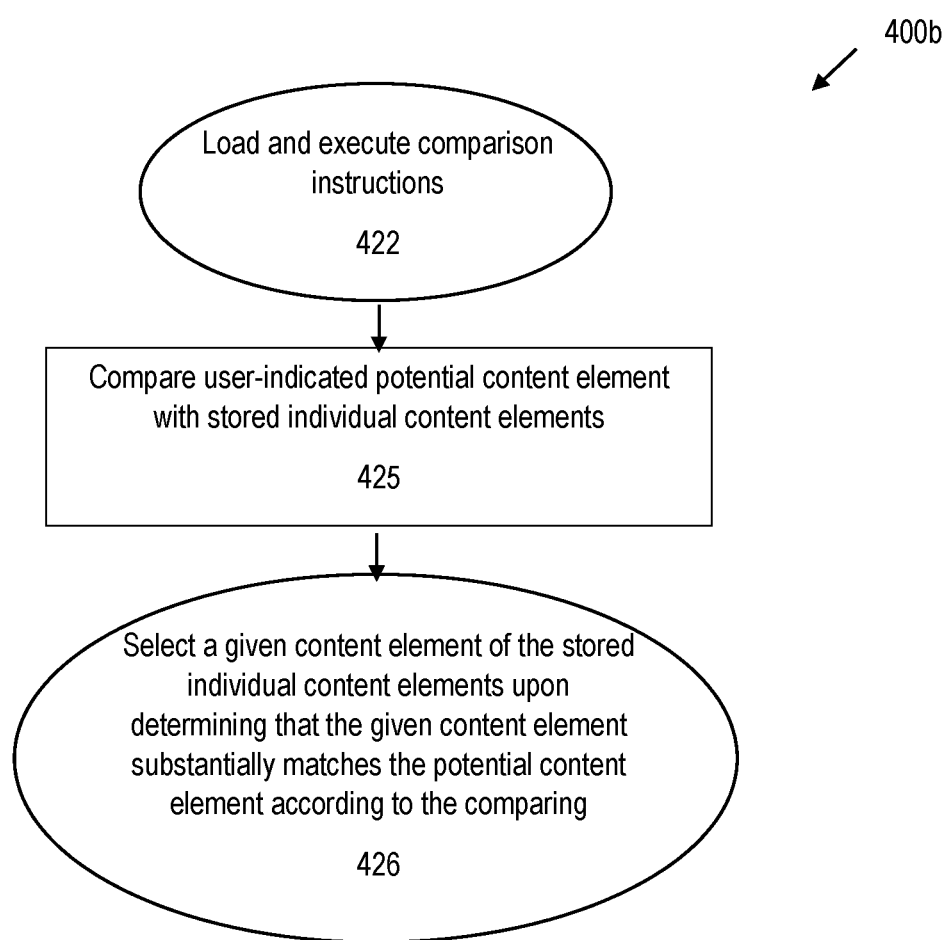
FIG. 4B is a flowchart of an example method of monitoring a content element file to be used in an embodiment of a method of streaming selected media content to a client device of a user.

FIG. 4B is a flowchart of an example method 400*c* of monitoring 420 the content element file 218, to be used in embodiments 400*a* of a method of streaming selected media content to a client device 150. The method 400*c* begins at step 422 by loading and executing comparison instructions. The comparison instructions 422 represent a real-time search engine. The method 400*c* continues at step 425 with the real-time search engine comparing 425 a user indicated potential content element with stored individual content elements 217. The method 400*c* then selects a given content element 426 of the stored individual content elements 217 upon determining that a given content element 426 substantially matches the potential content element according to the comparison of step 425.

Figure 5A:
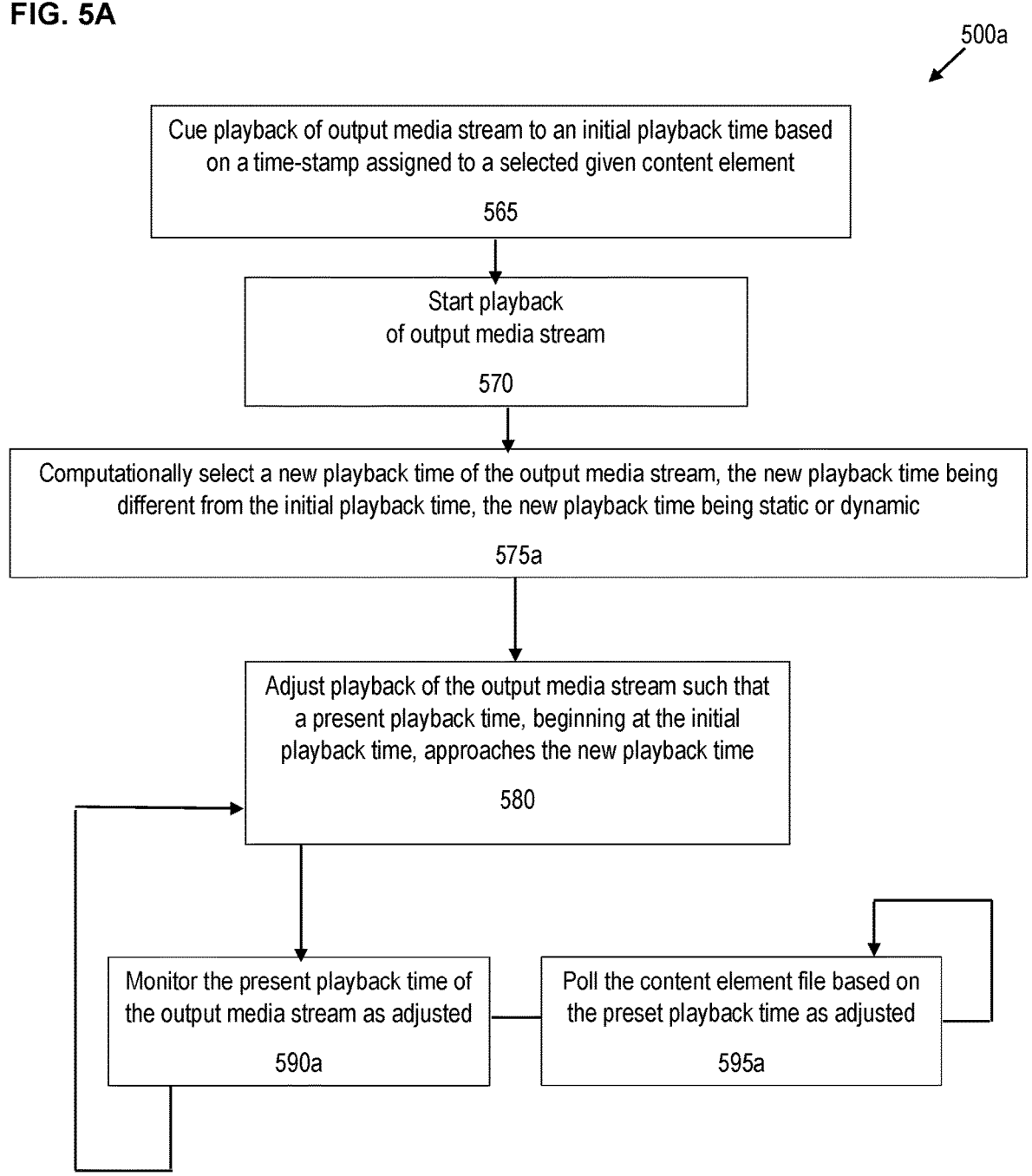
FIGS. 5A and 5B are flowcharts of example methods of adjusting playback of an output media stream to be used in an embodiment of a method of streaming selected media content to a client device of a user.

FIG. 5A is a flowchart of an example method 500*a* of adjusting playback of an output media stream to be used in conjunction with a method 400*a* of streaming selected media content to a client device 150 of a user. The method 500*a* begins at step 565 by cueing playback of the transcoded output media stream 430 to an initial playback time based on a time-stamp assigned to a selected given content element 426, such as the detected parsed content 410. The method 500*a* continues by starting playback 570 of the transcoded output media stream 430. The method 500*a* computationally selects a new playback time 575*a* of the transcoded output media stream 430. The new selected playback time 575*a* is different from the initial playback time. The new selected playback time 575*a* may be static or dynamic. The method 500*a* continues by adjusting playback 580 of the transcoded output media stream 430 such that a present playback time, beginning at the initial playback time, approaches the new selected playback time 575*a*. The method 500*a* continues at step 590*a* by monitoring the present playback time of the transcoded output media stream 430 as adjusted. Such monitoring 590*a* may include polling 595*a* the content element file 218 based on the present playback time as adjusted.

Figure 5B:
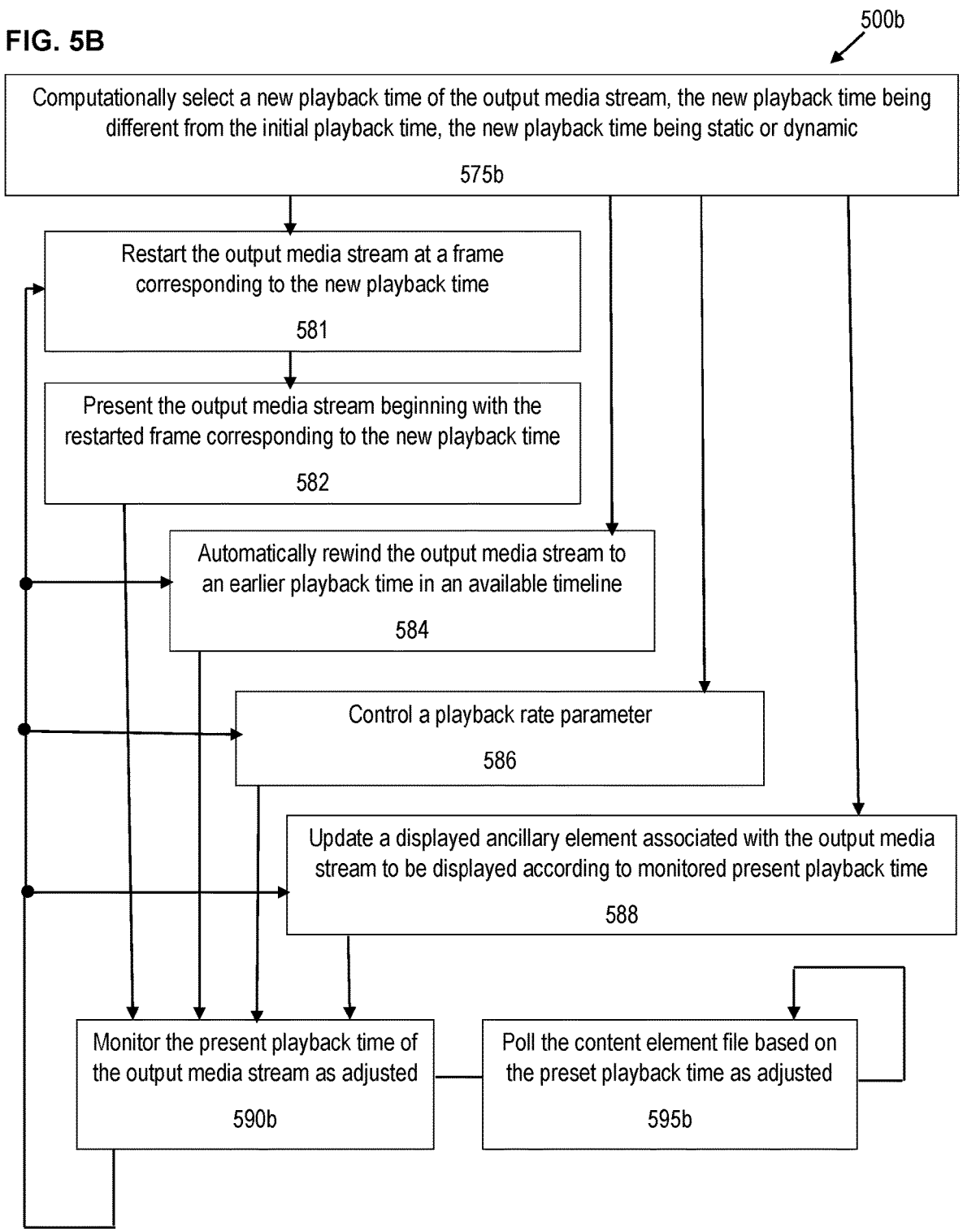

FIG. 5B is a flowchart of an example method 500*b* of adjusting playback of an output media stream to be used in conjunction with a method 400*a* of streaming selected media content to a client device 150 of a user. Such a method 500*b* may enable a user to consume the selected media content immediately, or after a period of delay following notification of the selected media content via an alert 443. Such a method 500*b* may also enable a user to consume contextual information preceding an individual content element 217 detected 425 according to an alert request 413 as appropriate. The method 500*b* begins at step 575*b* by computationally selecting a new playback time of the transcoded output media stream 430. The new selected playback time 575*b* is different from the initial playback time. The new selected playback time 575*b* may be static or dynamic. In some embodiments, the method 500*b* restarts 581 the transcoded output media stream 430 at a frame corresponding to the new selected playback time 575*b*. In these embodiments, the method continues at step 582 by presenting the transcoded output media stream 430 beginning with the restarted frame corresponding to the new selected playback time 575*b*. In some embodiments, the new selected playback time 575*b* is used by the method 500*b* to automatically rewind the transcoded output media stream 430 to an earlier playback time in an available timeline. In some embodiments, the method 500*b* may respond to user actuation of playback controls such as rewinding and/or forwarding to approach the new selected playback time 575*b*. In still other embodiments, the new selected playback time 575*b* is used by the method 500*b* to control a playback rate parameter 586. In still other embodiments, the new selected playback time 575*b* is used by the method 500*b* to update a displayed ancillary element 588 associated with the transcoded output media stream 430 to be displayed according to the monitored 590*b* present playback time. In any of the aforementioned embodiments, the method 500*b* continues by monitoring 590*b* the present playback time of the transcoded output media stream 430. The monitoring 590b may include polling 595b the content element file 218 based on the present playback time as adjusted.

While example embodiments have been particularly shown and described, it will be understood by those skilled in the art that various changes in form and details may be made therein without departing from the scope of the embodiments encompassed by the appended claims.

What is claimed is:

1. A computer system for streaming selected media content to a client device of a user, the system comprising:
 a streaming media server configured to:
  receive an input media stream from a media encoder, the media encoder capturing and encoding input content from a source device into the input media stream;
  parse the encoded input content of the input media stream into time-stamped individual content elements, or representations thereof, stored within a content element file;
  receive an alert request from a client device of a user, the alert request specifying a potential content element;
  monitor the content element file for an instance of the potential content element by loading and executing comparison instructions representing a real-time search engine, the real-time search engine comparing the potential content element with the stored individual content elements, the real-time search engine facilitating selection of a given content element of the stored individual content elements upon determining that the given content element substantially matches the potential content element according to the comparing;
  generate and transmit to the client device an alert corresponding to the selected given content element, the alert including a prompt enabling the client device to connect to the input media stream via the streaming media server;
  transcode the input media stream in a streaming format compatible with content delivery, the transcoded media stream being the output media stream; and
 a multimedia player coupled to the streaming media server, the multimedia player executing on the client device and configured to:
  load the output media stream from a location parsed from the content element file;
  cue playback of the output media stream to a playback time based on the time-stamp assigned to the selected given content element of the stored individual content elements; and
  start playback of the output media stream, thereby streaming the selected given content element to the client device.

2. The system of claim 1 wherein the individual content elements include at least one of:
 individual spoken words, or groups thereof, received audibly within the encoded input content;
 aspects of individual spoken words, or groups thereof, including at least one of topic, tone, sentiment, and volume;
 individual written words, or groups thereof, received visually within the encoded input content;
 aspects of individual written words, or groups thereof, including topic;
 images received visually within the encoded input content; and
 aspects of images including types, the types including at least one of lecture slides, photographs, technical data plots, and financial data plots.

3. The system of claim 1 wherein the streaming media server includes an artificial intelligence module configured to use machine learning to perform at least one of the parsing and the monitoring.

4. The system of claim 1 wherein the streaming media server includes an optical character recognition module configured to identify the individual content elements.

5. The system of claim 1 wherein the output media stream is a live stream, and wherein the live stream is buffered or unbuffered.

6. The system of claim 1 wherein the output media stream is a stored media segment.

7. The system of claim 1 wherein the playback time is an initial playback time and the multimedia player is further configured to:
 computationally select a new playback time of the output media stream, the new playback time being different from the initial playback time, the new playback time being static or dynamic;
 adjust playback of the output media stream such that a present playback time, beginning at the initial playback time, approaches the new playback time; and
 monitor the present playback time of the output media stream as adjusted, including by polling the content element file based on the present playback time as adjusted.

8. The system of claim 7 wherein adjusting playback of the output media stream comprises restarting the output media stream at a frame of the output media stream corresponding to the new playback time, such that the initial playback time is the same as the new playback time, and presenting the output media stream at the multimedia player beginning with the restarted frame corresponding to the new playback time.

9. The system of claim 7 wherein adjusting playback of the output media stream comprises automatically rewinding the output media stream to an earlier playback time in an available timeline for the output media stream.

10. The system of claim 7 wherein adjusting playback of the output media stream comprises controlling a playback rate parameter.

11. The system of claim 7 wherein adjusting playback of the output media stream comprises updating a displayed ancillary element associated with the output media stream to be displayed according to the monitored present playback time.

12. A computer-implemented method of streaming selected media content to a client device of a user, the method comprising:
 at a streaming media server:
  receiving an input media stream from a media encoder, the media encoder capturing and encoding input content from a source device into the input media stream;
  parsing the encoded input content of the input media stream into time-stamped individual content elements, or representations thereof, stored within a content element file;
  receiving an alert request from a client device of a user, the alert request specifying a potential content element;
  monitoring the content element file for an instance of the potential content element by loading and executing comparison instructions representing a real-time search engine, the real-time search engine comparing the potential content element with the stored individual content elements, the real-time search engine facilitating selection of a given content element of the stored individual content elements upon determining that the given content element substantially matches the potential content element according to the comparing;

generating and transmitting to the client device an alert corresponding to the selected given content element, the alert including a prompt enabling the client device to connect to the input media stream via the streaming media server;

transcoding the input media stream in a streaming format compatible with content delivery, the transcoded media stream being the output media stream; and at a multimedia player coupled with the streaming media server, the multimedia player executing on the client device:

loading the output media stream from a location parsed from the content element file;

cueing playback of the output media stream to a playback time based on the time-stamp assigned to the selected given content element; and starting playback of the output media stream, thereby streaming the selected media content element to the client device.

13. The method of claim 12 wherein the individual content elements include at least one of:

individual spoken words, or groups thereof, received audibly within the encoded input content;

aspects of individual spoken words, or groups thereof, including at least one of topic, tone, sentiment, and volume;

individual written words, or groups thereof, received visually within the encoded input content;

aspects of individual written words, or groups thereof, including topic;

images received visually within the encoded input content; and aspects of images including types, the types including at least one of lecture slides, photographs, technical data plots, and financial data plots.

14. The method of claim 12 wherein at least one of the parsing and the monitoring are performed by an artificial intelligence module using machine learning.

15. The method of claim 12 wherein the streaming media server identifies the individual content elements by controlling an optical character recognition module associated with the streaming media server.

16. The method of claim 12 wherein the output media stream is a live stream, and wherein the live stream is buffered or unbuffered.

17. The method of claim 12 wherein the output media stream is a stored media segment.

18. The method of claim 12 wherein the playback time is a initial playback time, the method further comprising, at the multimedia player:

computationally selecting a new playback time of the output media stream, the new playback time being different from the initial playback time, the new playback time being static or dynamic;

adjusting playback of the output media stream such that a present playback time, beginning at the initial playback time, approaches the new playback time; and monitoring the present playback time of the output media stream as adjusted, including by polling the content element file based on the present playback time as adjusted.

19. The method of claim 18 wherein adjusting playback of the output media stream comprises restarting the output media stream at a frame of the output media stream corresponding to the new playback time, such that the initial playback time is the same as the new playback time, and presenting the output media stream at the multimedia player beginning with the restarted frame corresponding to the new playback time.

20. The method of claim 18 wherein adjusting playback of the output media stream comprises automatically rewinding the output media stream to an earlier playback time in an available timeline for the output media stream.

21. The method of claim 18 wherein adjusting playback of the output media stream comprises controlling a playback rate parameter.

22. The method of claim 18 wherein adjusting playback of the output media stream comprises updating a displayed ancillary element associated with the output media stream to be displayed according to the monitored present playback time.

* * * * *